(12) United States Patent
Ishikawa et al.

(10) Patent No.: US 8,194,879 B2
(45) Date of Patent: Jun. 5, 2012

(54) ULTRA-LIGHT SOUND INSULATOR

(75) Inventors: Masaki Ishikawa, Anjyo (JP); Youhei Ishikawa, Anjyo (JP); Sohei Matsuyama, Nukata-gun (JP); Hideyuki Mori, Inuyama (JP)

(73) Assignees: Takehiro Co., Ltd., Anjyo-Shi (JP); Toyota Boshoku Kabushiki Kaisha, Kariya-Shi (JP)

( * ) Notice: Subject to any disclaimer, the term of this patent is extended or adjusted under 35 U.S.C. 154(b) by 1334 days.

(21) Appl. No.: 11/609,930

(22) Filed: Dec. 13, 2006

(65) Prior Publication Data

US 2007/0144829 A1 Jun. 28, 2007

(30) Foreign Application Priority Data

Dec. 13, 2005 (JP) ................................. 2005-359617

(51) Int. Cl.
*H04B 1/00* (2006.01)
*H04R 1/02* (2006.01)
*E04B 1/82* (2006.01)

(52) U.S. Cl. ........... 381/86; 381/345; 181/284; 181/294

(58) Field of Classification Search .................... 381/86, 381/345; 181/286, 289, 290, 284, 294; 296/146.1
See application file for complete search history.

(56) References Cited

U.S. PATENT DOCUMENTS

| 4,131,664 A | * | 12/1978 | Flowers et al. | ................ | 264/510 |
| 6,145,617 A | | 11/2000 | Alts | | |
| 6,669,265 B2 | * | 12/2003 | Tilton et al. | ................ | 296/146.1 |
| 6,802,389 B2 | | 10/2004 | Tompson et al. | | |
| 7,055,649 B2 | | 6/2006 | Tompson et al. | | |
| 7,137,477 B2 | | 11/2006 | Keller et al. | | |

FOREIGN PATENT DOCUMENTS

| FR | 2 870 160 A1 | 11/2005 |
| JP | 10-207469 A | 8/1998 |
| JP | 2000-516175 A | 12/2000 |
| JP | 2004-90532 A | 3/2004 |
| JP | 2005-195989 A | 7/2005 |
| JP | 2005-523196 A | 8/2005 |
| WO | 98/18657 A1 | 5/1998 |
| WO | 02/098643 A2 | 12/2002 |
| WO | 03/089731 A1 | 10/2003 |
| WO | 2004/088025 A1 | 10/2004 |
| WO | 2004/107314 A1 | 12/2004 |

* cited by examiner

*Primary Examiner* — Curtis Kuntz
*Assistant Examiner* — Sunita Joshi
(74) *Attorney, Agent, or Firm* — Matthias Scholl, PC; Matthias Scholl

(57) ABSTRACT

The objective of the present invention is to efficiently and inexpensively mass-produce a sound insulator for a vehicle which is light in weight and has excellent sound insulating properties. For this purpose, the ultra-light sound insulator of the present invention is composed of a felt single sheet 3 having a vehicle interior side surface 1 and a vehicle exterior side surface 2 and being thermoformed of cotton fibers and binder fibers which are tangled and contacted and jointed to each other in a random manner. The ratio of the stiffness of the vehicle interior side surface 1 to that of the vehicle exterior side surface 2 is set to be in a range of 1.1 to 10. The single sheet 3 also has an area of gradually-decreasing stiffness 4 that spreads over at least one part of the area between the vehicle interior side surface 1 and the vehicle exterior side surface 2. The area of gradually-decreasing stiffness 4 has a stiffness distribution pattern in which the stiffness decreases gradually from the vehicle interior side surface 1 toward the vehicle exterior side surface 2 with respect to the direction perpendicular to the vehicle exterior side surface 2.

23 Claims, 14 Drawing Sheets

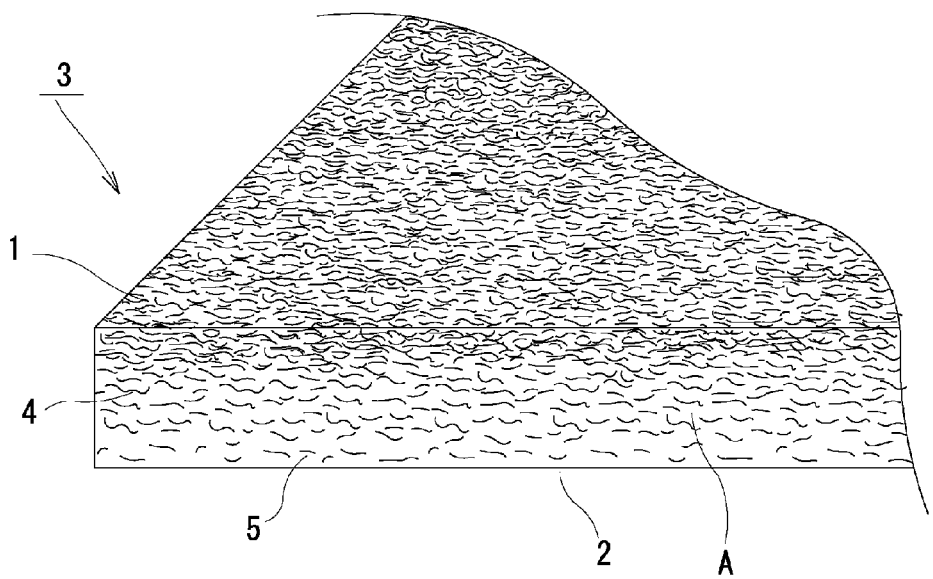
Fig. 1
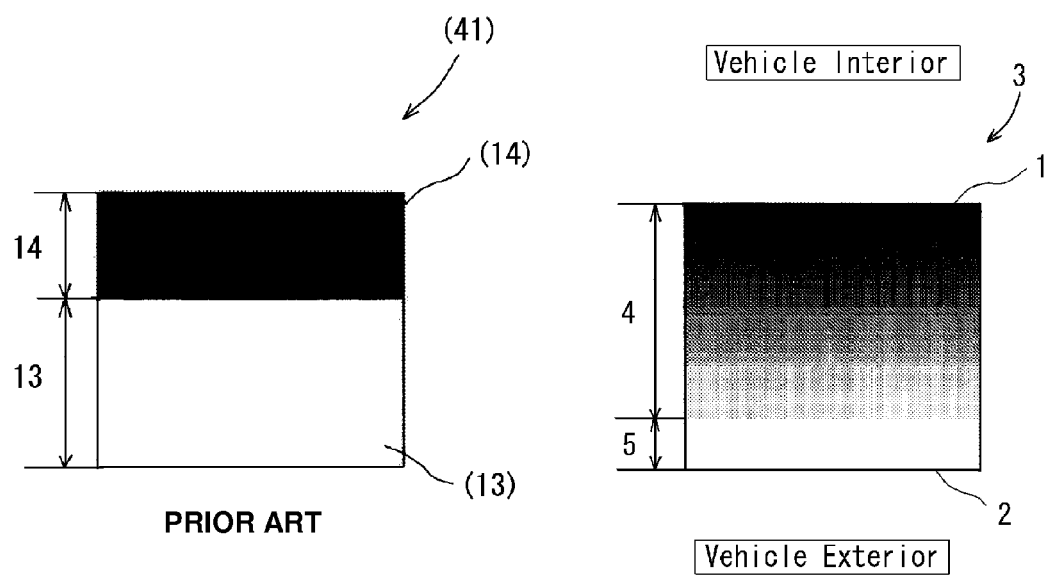
Fig. 2a  PRIOR ART
Fig. 2b

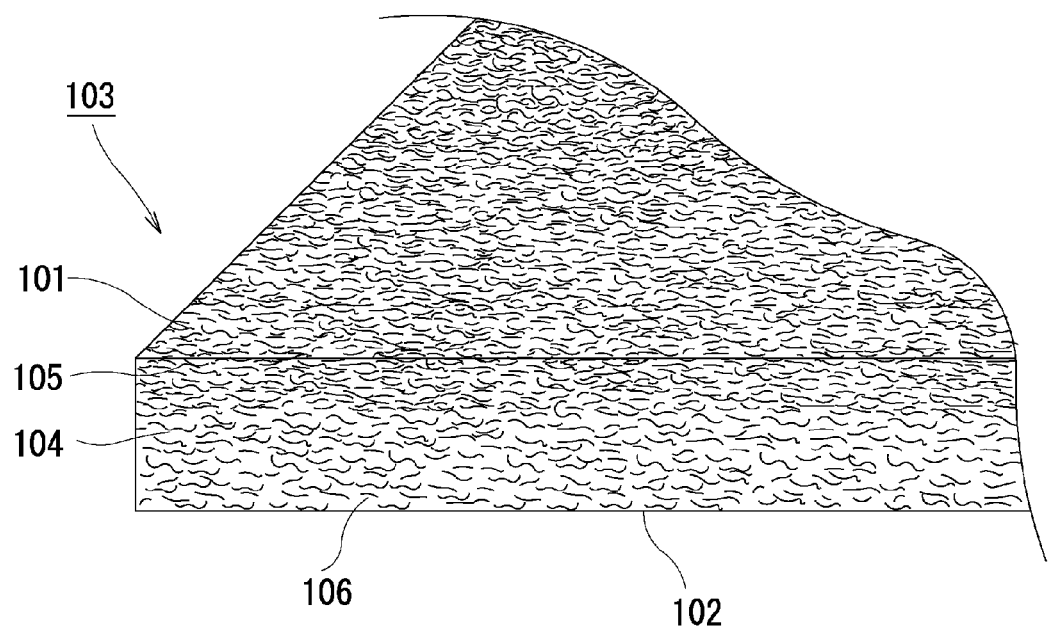
Fig. 14
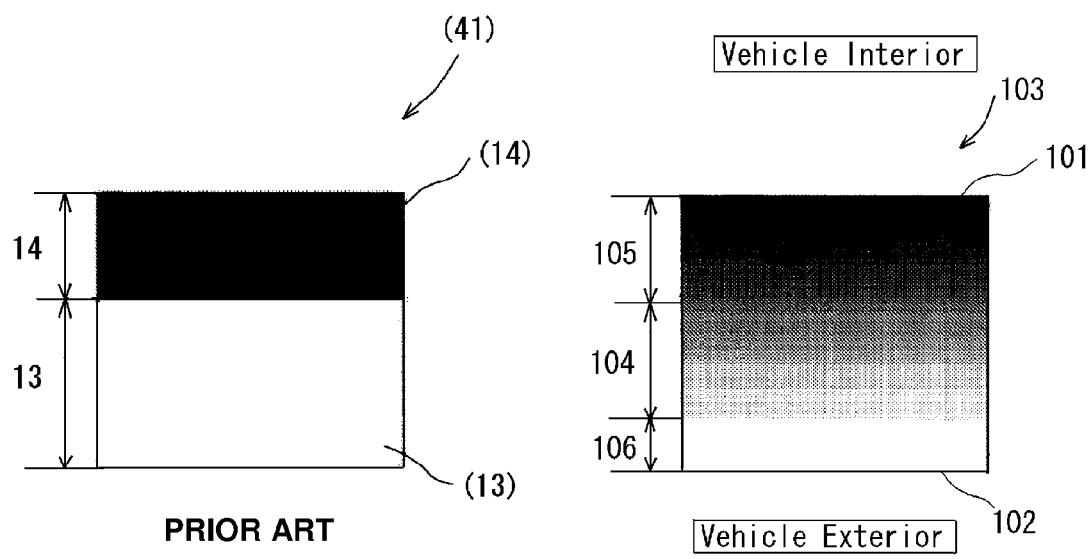
PRIOR ART
Fig. 15a
Fig. 15b

ULTRA-LIGHT SOUND INSULATOR

CROSS-REFERENCE TO RELATED APPLICATIONS

This application claims priority to Japanese Patent Application No. 2005-359617 filed Dec. 13, 2005, the contents of which are incorporated herein by reference.

BACKGROUND OF THE INVENTION

1. Field of the Invention

This invention relates to an ultra-light sound insulator that reduces noise in a vehicle interior.

2. Brief Description of Related Arts

Japanese Patent Publication No. 2000-516175 discloses an ultra-light multifunctional insulating kit 41, which is used in vehicles to attain noise reduction and heat insulation. Sound-absorbing, sound-insulating, oscillation-damping, and heat-insulating properties are explored for use in floor insulation, end wall insulation, door covering, and inner roof covering of vehicles. The multifunctional kit 41 includes at least one areal vehicle part 11 and a multi-layer noise-reducing assembly package 42. The assembly package 42 has at least one porous spring layer 13, which is preferably formed from an open-pored foam layer. An air gap 25 is interposed between the assembly package 42 and the areal vehicle part 11. The multi-layer assembly package 42 does not have a heavy-weight layer to give the ultra-light kit 41 a suitable and optimal combination of sound-insulating, sound-absorbing, and oscillation-damping properties. The assembly package 42 also has a micro-porous stiff layer 14, which consists preferably of an open-pored fiber layer or fiber/foam composite layer. The micro-porous stiff layer 14 has a total airflow resistance from $R_t=500$ Nsm$^{-3}$ to $R_t=2500$ Nsm$^{-3}$, in particular from $R_t=900$ Nsm$^{-3}$ to $R_t=2000$ Nsm$^{-3}$, and an area-weight (weight per unit area) from $m_F=0.3$ kg/m$^2$ to $m_F=2.0$ kg/m$^2$, and in particular from $m_F=0.5$ kg/m$^2$ to $m_F=1.6$ kg/m$^2$.

According to Japanese Patent Publication No. 2000-516175, an ultra-light kit having a good acoustic efficiency can be realized when the kit is applied to a light-weight vehicle part made, for example, of aluminum or plastic. The sound insulating kit described therein is said to be lighter than a conventional sound insulation assembly by more than 50% and yet it also retains a heat-insulating property. Particularly, this type of kit can be obtained by replacing an air-impermeable heavy-weight layer used in a prior spring-mass system by a thinner micro-porous stiff fiber layer or fiber/foam composite layer. The micro-porous fiber layer has open pores but it also has a rather high resistance against airflow. For this to be accomplished, it is allegedly essential to form an air gap within the sound absorbing kit. The air gap is preferably located between the areal vehicle part and the other layers. As a result, the weight of the sound insulating system is reduced compared to a prior spring-mass system. This is preferable for the enhancement of sound absorption. A kit having a high efficiency is realized by choosing an optimum combination of sound-insulating and sound-absorbing properties. This kit can realize an extremely light structure yet it features an acoustic property that is not inferior to a conventional sound insulation assembly. Additionally, sound insulating properties are improved significantly, in a resonance domain.

However, the conventional insulating kit 41 of prior art discloses a multilayered laminated structure, a spring layer 13 having a uniform stiffness, and a stiff layer 14 having a uniform stiffness shown in FIG. 2a and FIG. 3a. The multi-layers of kit 41 are made each of a different material. Accordingly, the spring layer 13, for example, in the nature of a molded foam layer, and the stiff layer 14, for example, in the nature of a highly pressed micro-porous fiber layer need to be produced separately and then combined by means such as adhesion, resulting in a greater complexity of production and a higher cost.

In addition, the tuning of sound insulating properties (transmission loss and sound absorption rate) depending on a part of vehicle where the sound insulator is to be applies needs to be done separately for each of the layers. Adjustment of sound insulating properties is thus very complicated. As described above, conventional sound insulators suffer from problems, such as complicated production processes, higher production costs, and difficult tuning of sound insulating properties.

SUMMARY OF THE INVENTION

One object of the present invention is thus to efficiently and inexpensively mass-produce an ultra-light sound insulator which is light in weight and has excellent sound insulating properties, to simplify the production process of conventional ultra-light sound insulators, and to facilitate the tuning of the sound insulating properties of these insulators.

Accordingly, the first embodiment of the invention provides an ultra-light sound insulator having a thickness and comprising an exterior side surface; an interior side surface; and at least one area of gradually-decreasing stiffness disposed between the exterior side surface and the interior side surface; wherein the stiffness of the area of gradually-decreasing stiffness decreases gradually in the direction of the exterior side surface.

In a class of the first embodiment, the area of gradually-decreasing stiffness is made of cotton fibers and binder fibers.

In another class of the first embodiment, the stiffness ratio of the interior side surface to the exterior side surface is between 1.1 and 10.

In another class of the first embodiment, the air permeation of the insulator is between 3 and 25 cm$^3$/cm$^2$·sec.

In another class of the first embodiment, the area of gradually-decreasing stiffness extends over at least a portion of the thickness of the insulator.

In another class of the first embodiment, the area of gradually-decreasing stiffness extends over the entire the thickness of the insulator.

In another class of the first embodiment, the air permeation of the insulator is a function of the rate at which the stiffness changes within the area of gradually-decreasing stiffness.

In another embodiment, the insulator further comprises at least one area of uniform stiffness, wherein the area of uniform stiffness is disposed between the area of gradually-decreasing stiffness and the exterior side surface.

In another embodiment, the insulator further comprises at least one area of uniform stiffness, wherein the area of uniform stiffness is disposed between the area of gradually-decreasing stiffness and the interior side surface.

In yet another embodiment, the insulator further comprises two areas of uniform stiffness, wherein one the area of uniform stiffness is disposed between the area of gradually-decreasing stiffness and the interior side surface, and the other area of uniform stiffness is disposed between the area of gradually-decreasing stiffness and the exterior side surface.

In certain classes of embodiments, insulators taught herein are a felt single sheet insulators. These can be produced in a simplified production process and at a very low cost, which is advantageous for mass-production.

Additionally, the sound insulating properties of the insulators taught herein can be tuned easily depending on the properties of the area of gradually-decreasing stiffness.

When the sound insulators are used in vehicles, they can be attached to vehicle parts without the need for hot-molding. Thus, the hot-molding cost can be eliminated and the process for attaching the insulators to vehicle parts can be simplified.

However, hot-molding can be used if desired. For example, when the insulator sheet is to be attached to a dash silencer and the like, hot-molding to make it fit to the shape of the dash silencer and the like may be necessary. If hot-molding is used, the stiffness distribution in the insulator sheet may be changed due to heat. Accordingly, it is preferable that the stiffness distribution pattern is designed with this in mind. Also, the insulator may be hot-molded by being cold press molded with a cold press metal mold after being heated or being cooled down at room temperature after being thermo pressed.

BRIEF DESCRIPTION OF THE DRAWINGS

FIG. 1 is a partial perspective view of an ultra-light sound insulator according to a first embodiment of the present invention;

FIG. 2a is a cross-sectional schematic view of an ultra-light sound insulating kit (41) of prior art;

FIG. 2b is a cross-sectional schematic view of an ultra-light sound insulator according to the first embodiment of the present invention;

FIG. 14 is a partial perspective view of an ultra-light sound insulator according to a second embodiment of the present invention;

FIG. 15a is a cross-sectional schematic view of an ultra-light sound insulation kit (41) of prior art;

FIG. 15b is a cross-sectional schematic view of an ultra-light sound insulator according to the second embodiment of the present invention;

DETAILED DESCRIPTION OF THE PREFERRED EMBODIMENTS

An ultra-light sound insulator of a first embodiment according to the present invention will be described hereinafter with reference to the accompanying drawings.

As shown in FIG. 1, the first embodiment according to the present invention provides an ultra-light sound insulator in the nature of a single insulator sheet 3 comprising an air-permeable felt having a vehicle interior side surface 1 and a vehicle exterior side surface 2 and being thermoformed of cotton fibers and binder fibers, which fibers are tangled and contacted and jointed to each other in a random manner. The single insulator sheet 3 has an overall average density in a range from 0.01 to 0.2 g/cm$^3$, more preferably in a range from 0.03 to 0.08 g/cm$^3$, and a total area-weight (weight per unit area) in a range from 500 g/m$^2$ to 2500 g/m$^2$, and an total thickness in a range from 5 to 50 mm. As shown in FIG. 2b, the stiffness of the vehicle interior side surface 1 is by design set to be greater than that of the vehicle exterior side surface 2, with the ratio of the stiffness of the vehicle interior side surface 1 to that of the vehicle exterior side surface 2 being in a range from 1.1 to 10, more preferably in a range from 1.1 to 5, and more preferably in a range from 1.1 to 3. The vehicle interior side surface 1 faces to a vehicle interior and the vehicle exterior side surface faces to a vehicle exterior. The single sheet 3 also comprises an area of gradually-changing stiffness 4, i.e., an area of gradually-decreasing stiffness 4 spreading over a part of the cross-sectional area or the entire cross-sectional area between the vehicle interior side surface 1 and the vehicle exterior side surface 2.

Figure 3A:
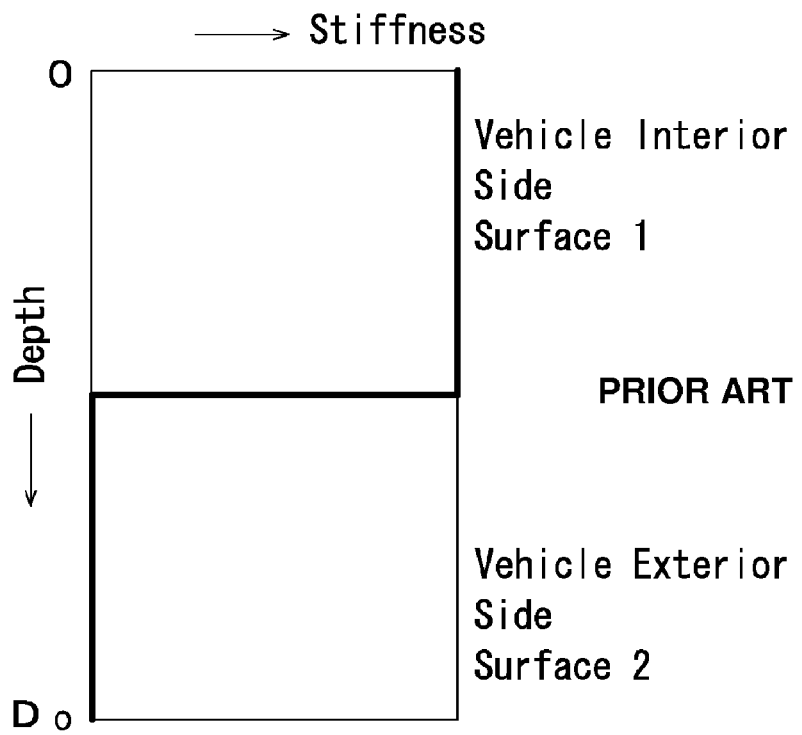
FIG. 3a shows the stiffness distribution pattern of an ultra-light sound insulation kit (41) of prior art.
Figure 3B:
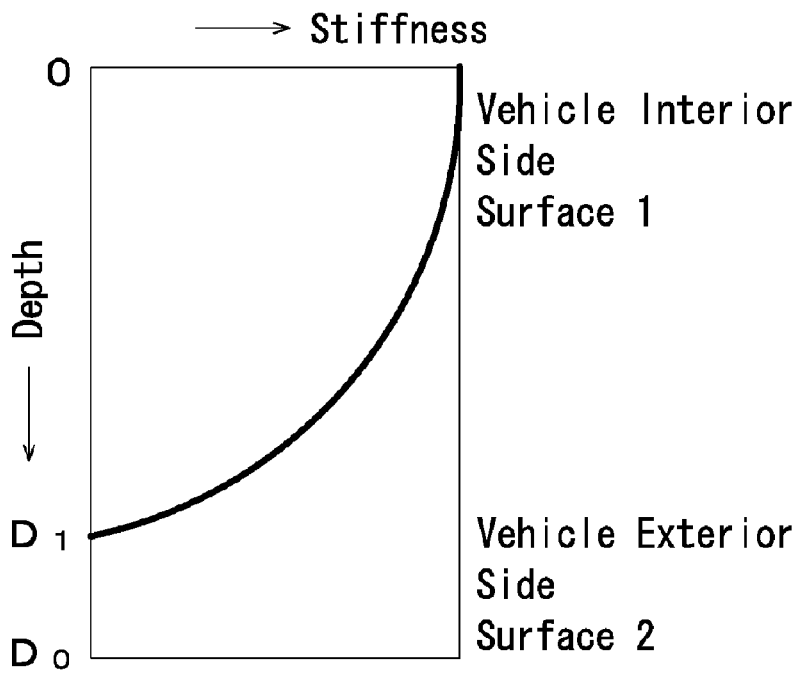
FIG. 3b shows the stiffness distribution pattern of the ultra-light sound insulator according to the first embodiment of the present invention.
Figure 4:
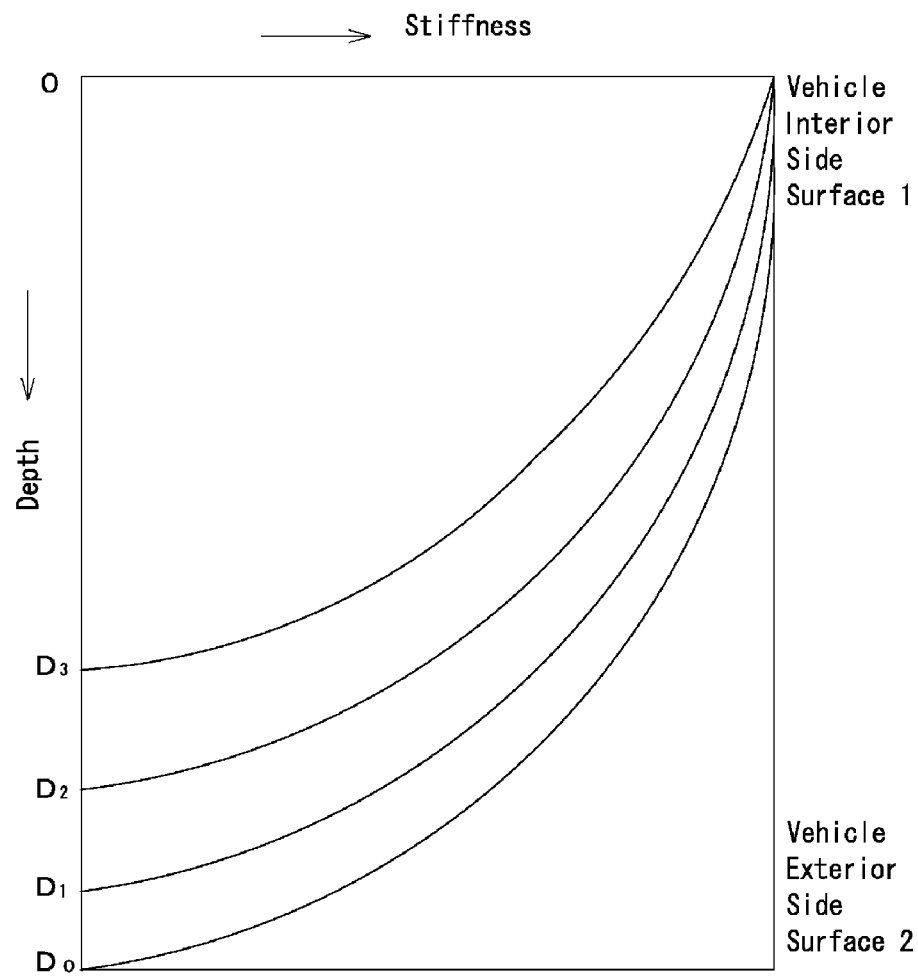
FIG. 4 shows stiffness distribution patterns of ultra-light sound insulators according to the first embodiment of the present invention.

FIG. 3a shows an example of a stiffness distribution pattern of conventional sound insulators found in the prior art. Exemplified is a sound insulator formed of two layers of different materials, wherein each layer has its own uniform and non-variant density and the density of one layer differs from that of the other layer. Accordingly, the stiffness distribution graph of conventional sound insulators has a step-like pattern as shown in FIG. 3a. By means of comparison, FIG. 3b illustrates a non-limiting example of the stiffness distribution pattern of an ultra-light sound insulator according to the first embodiment of this invention, in which the vertical axis corresponds to a line normal to the vehicle interior side surface 1 (a line also representing the thickness of the insulator). With reference to FIGS. 3b and 4, the ultra-light sound insulator of the first embodiment has an average stiffness distribution pattern wherein the stiffness is set by design to decrease gradually starting from the vehicle interior side surface 1 towards the vehicle exterior side surface 2. The illustrated stiffness distribution patterns are averaged over a cross-sectional area. Practically, the density distribution may be fluctuating along a direction parallel to the vehicle interior side surfaces 1 and/or the vehicle exterior side surface 2. Similarly, the density distribution may be fluctuating along the direction perpendicular to the vehicle side surfaces 1 and/or the vehicle exterior side surface 2. However, as averaged over the entire cross-sectional area between the vehicle side surfaces 1 and the vehicle exterior side surface 2, the ultra-light sound insulator has a stiffness distribution pattern in which the stiffness is decreasing gradually starting from the vehicle interior side surface 1 towards the vehicle exterior side surface 2.

Specifically, there may be sub-areas where the stiffness increases locally between the vehicle interior side surface 1 and the vehicle exterior side surface 2 even though the stiffness decreases in the average over a larger area or the area as a whole. Moreover, in a class of the first embodiment that will be described with more specificity later, the rate at which the stiffness decreases within the area of gradually-decreasing stiffness 4 is non-uniform and fluctuates. However, in certain other classes of this embodiment, the rate at which the stiffness decreases within the area of gradually-decreasing stiffness 4 is constant and does not fluctuate depending on production conditions.

The stiffness variation pattern of this embodiment as shown in FIG. 3b is convex, however, it may be concave. Various stiffness distribution patterns are possible for this embodiment and a few non-limiting examples are shown in FIG. 4 (as labeled with $D_0$ though $D_3$). These patterns include, e.g., (a) patterns in which the area of gradually-decreasing stiffness 4 reaches up to the vehicle exterior side surface 2 at the depth $D_0$, that is in which the area of gradually-decreasing stiffness 4 extends over the entire cross-sectional area of the insulator sheet 3, and (b) patterns in which the area of gradually-decreasing stiffness 4 reaches to a certain depth, e.g., $D_1$-$D_3$, that is in which an area 5 having a non-varying stiffness is formed on either side of the area of gradually-decreasing stiffness 4 as seen from the perspective of the vehicle interior side surface 1 or the vehicle exterior side surface 2.

Figure 5:
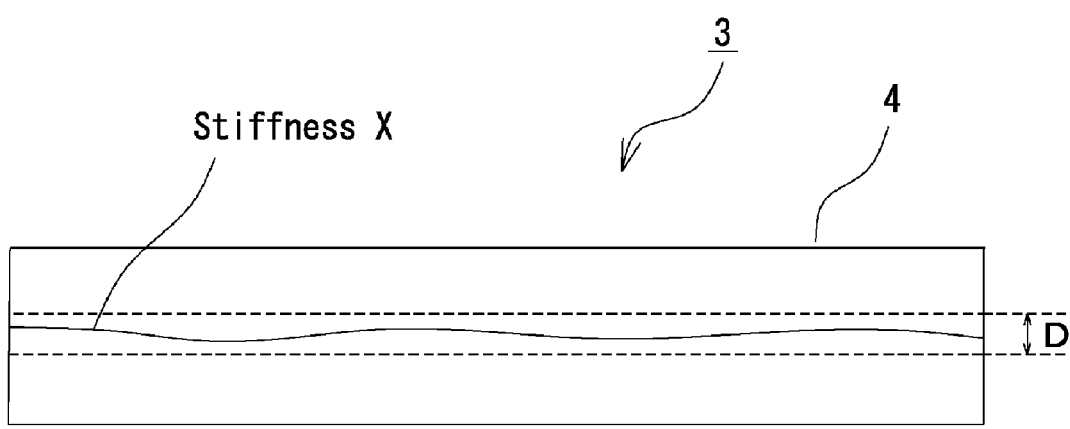
FIG. 5 shows a stiffness distribution pattern along the horizontal direction of an ultra-light sound insulator according to the first embodiment of the present invention.

As shown in FIG. 5, in certain embodiments, the area of gradually-decreasing stiffness 4 is formed continuously along the horizontal direction and spreads to both side ends of the sheet 3. A line showing the stiffness of X, i.e., a constant stiffness line where the value of the stiffness=X, fluctuates up and down in a random manner along the horizontal direction of the sheet 3, but it does not protrude outside a certain band depth, D.

In the ultra-light sound insulator of the first embodiment, sound insulating properties can be tuned by changing the thickness and the stiffness variation patterns (stiffness variation rate and the like) of the area of gradually-decreasing stiffness 4 located between the vehicle interior side surface 1 and the vehicle exterior side surface 2.

Figure 6A:
FIGS. 6a through 6c show a method of measuring the stiffness of an ultra-light sound insulator according to the first embodiment of the present invention.
Figure 6B:
Figure 6C:
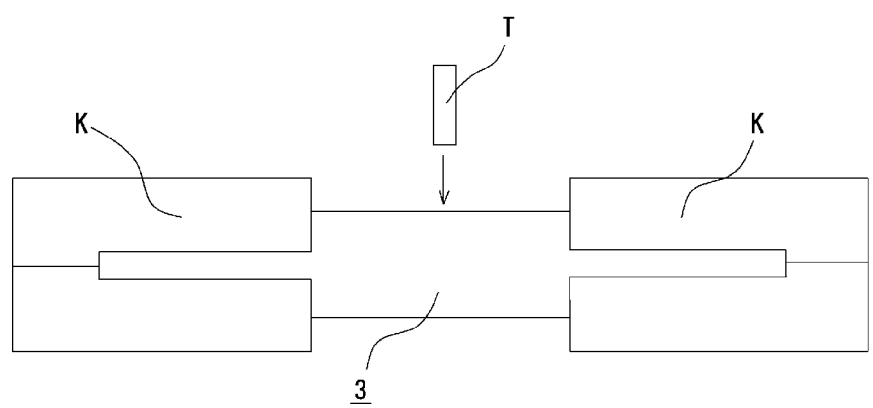

The term "stiffness," as used herein, refers to a quantity measured based on the flexural property measurement method described in Japanese Industrial Standard JIS A 5905. Specifically, the sheet 3 is cut into a size of 30 cm by 30 cm, with a cross-sectional area as shown in FIG. 6a. Predetermined areas at both ends of the cut-out sheet 3 are then pressed from above and from beneath using a pressing device to form high-stiffness areas H as shown in FIG. 6b. After fixing the high-stiffness parts H in fixing devices K, a load (W=5 N) is applied with a TENSILON T onto a point of the sheet 3 which is arranged with the surface having a higher stiffness being upward as shown in FIG. 6c. The amount of displacement in the vertical direction, $\delta_1$ (in cm), is thus measured and corresponds to a locally-displaced depth of the fiber structure displaced by the pressing device. Then, the direction of the sheet 3 is reversed, and the amount of displacement in the opposite direction, $\delta_2$ (in cm), of the surface having a lower stiffness is measured. A stiffness ratio $\delta_2/\delta_1$ is calculated.

The single sheet 3 has preferably a total area-weight in a range from 600 to 1500 g/m$^2$ and a total thickness in a range from 10 to 20 mm in the cases where the sheet is not molded in a later process, and preferably has an total area-weight in a range from 1400 to 2500 g/m$^2$ and a total thickness in a range from 15 to 35 mm in the case where the sheet is molded in a later process.

The single sheet 3 is preferably made of a thermoplastic felt, e.g., polyethylene terephthalate fibers and the like; a urethane mold; a urethane foam slab; RSPP (Recycled Sound-Proofing Products); and/or other materials. The material of which the felt is made is not limiting. For example, recycled fiber waste such as cloth fragments or single fiber fragments generated in a production process for making non-woven fabric, in a spinning process or sewing process may be used as material fibers for the production of the felt used in the present invention. Synthetic fibers such as polyester fibers, nylon fibers and/or acryl fibers, and natural fibers such as cotton fibers and/or wool fibers may also be used. It is generally preferable to use one type of fibrous material at a time after sorting recycled fiber wastes by type. But this is again non-limiting. Felt made from synthetic resin fibers such as reused synthetic fibers and PET fibers felted with binder fibers, which are a low melting point resin, is preferable as thermoplastic felt.

The air permeability of sheet 3 is set by design to fall in a range from 3 to 25 cm$^3$/cm$^2$·sec, and more preferably in a range from 5 to 25 cm$^3$/cm$^2$·sec by adjusting the stiffness distribution pattern of the area of gradually-decreasing stiffness 4 located between the vehicle interior side surface 1 and the vehicle exterior side surface 2. The air permeability is measured with a Frazil-type air permeability tester in conformity with Japanese Industrial Standard JIS L1018 8.3.3.1 as applicable to air permeability of knitted fabrics or an equivalent air permeability tester having an extremely high correlativity. A material is determined as air permeable when the measurement result is not less than 0.1 cm$^3$/cm$^2$·sec, which is the lowest measurable limit of the measurement system.

EXAMPLE 1

The ultra-light sound insulator is a single sheet insulator 3 made of felt and located in a vehicle interior. This insulator has an overall average density of 0.1 g/cm$^3$, a total area-weight of 2000 g/m$^2$, a total thickness of 20 mm, and an air permeability of 8 cm$^3$/cm$^2$·sec. The stiffness ratio of vehicle interior side surface 1 to vehicle exterior side surface 2 is 6.80/3.50=1.94. The area of gradually-decreasing stiffness 4, where stiffness decreases gradually from the vehicle interior side surface 1 towards the vehicle exterior side surface 2, is formed over the entire length of sheet 3 along its thickness direction.

Figure 7:
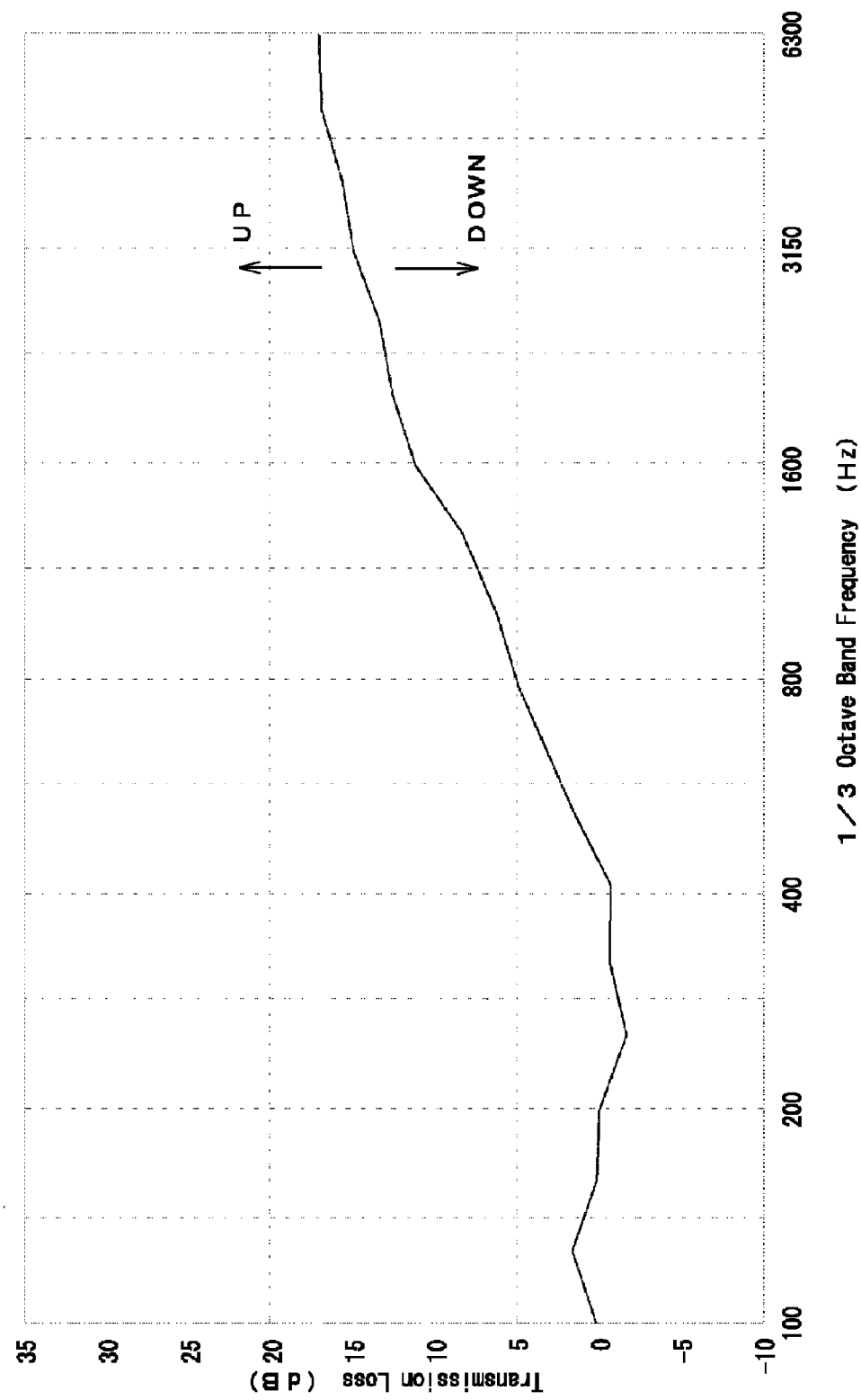
FIG. 7 is a graph showing a frequency-transmission loss curve of the ultra-light sound insulator.

FIG. 7 is a graph showing a transmission loss curve of ⅓ octave band center frequency (in Hz) versus transmission loss (in dB) with regard to the ultra-light sound insulator of this example. The graph illustrates a general tendency only. However, when the stiffness variation rate in vertical direction is set to be higher, the transmission loss tends to become higher, and when the stiffness variation rate in vertical direction is set to be lower, the transmission loss tends to become lower. Measurement of the transmission loss was performed according to the Japanese Industrial Standard JIS A 1409, with the difference that the sample size was 1 m$^2$.

Figure 8:
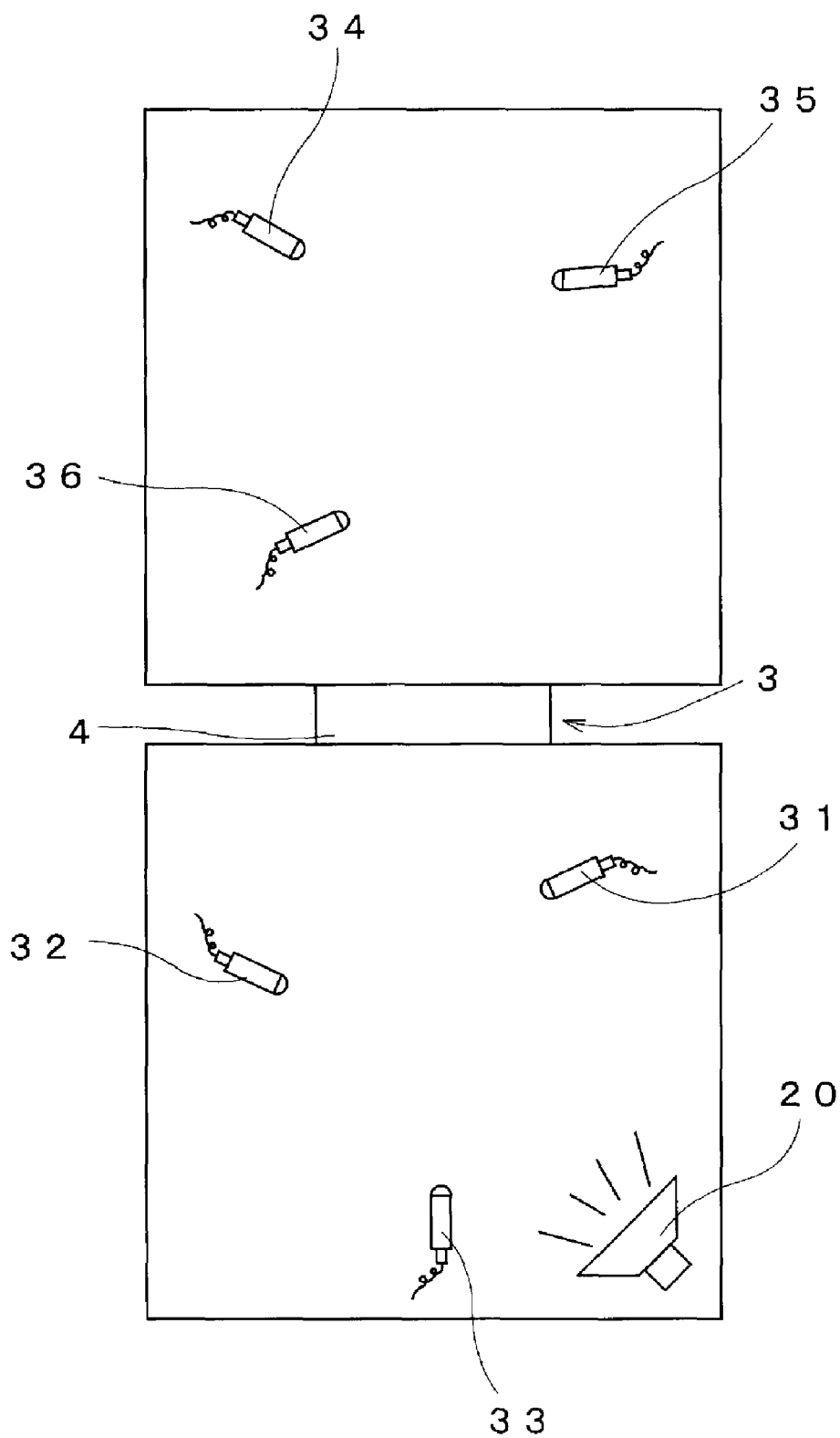
FIG. 8 is a plane view showing a measurement system of transmission loss.

FIG. 8 is a plane view showing measurement chambers as used for determining the transmission loss. A speaker 20 and microphones 31 through 36 were set in the measurement chambers, and a sample of the ultra-light sound insulator was set on the wall between the measurement chambers.

Figure 9:
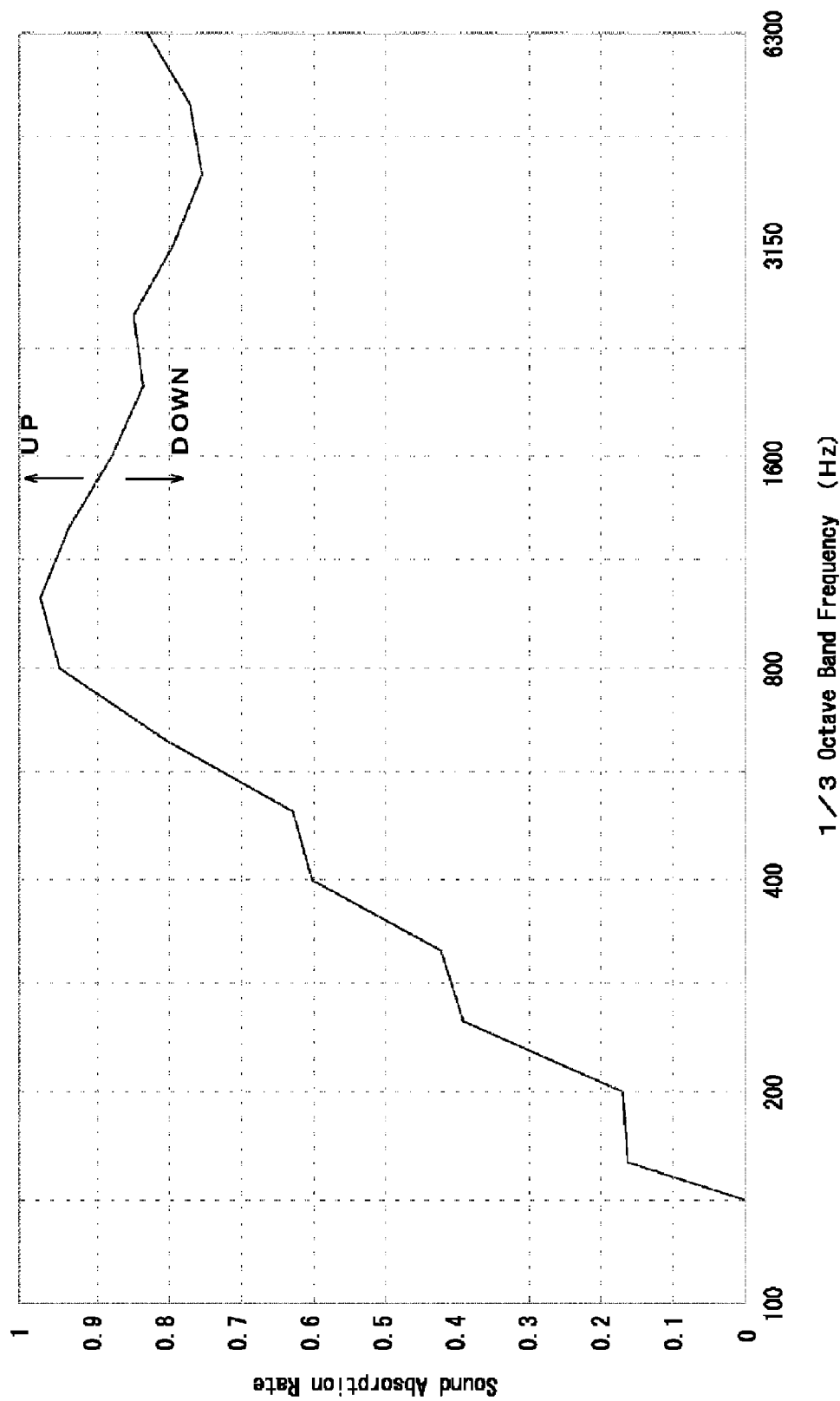
FIG. 9 is a graph showing a frequency-sound absorption rate curve of the ultra-light sound insulator.

FIG. 9 is a graph showing a sound absorption curve of ⅓ octave band center frequency (in Hz) versus sound absorption rate (no units) with regard to the ultra-light sound insulator of this example. The graph illustrates a general tendency only. The sound absorption rate does not change much when the stiffness variation rate is changed in vertical direction. However, when the stiffness variation rate is set to be too high in vertical direction, the airflow resistance tends to become lower, resulting in a increase in air permeation and a lower sound absorption rate, and when the stiffness variation rate in vertical direction is set to be lower, the airflow resistance tends to become higher, resulting in a decrease in air permeation and a higher sound absorption rate. Measurement of the sound absorption rate was performed according to Japanese Industrial Standard JIS A 1416 (sound absorption in a reverberation chamber), but the size of a sample was 1 m².

Figure 10:
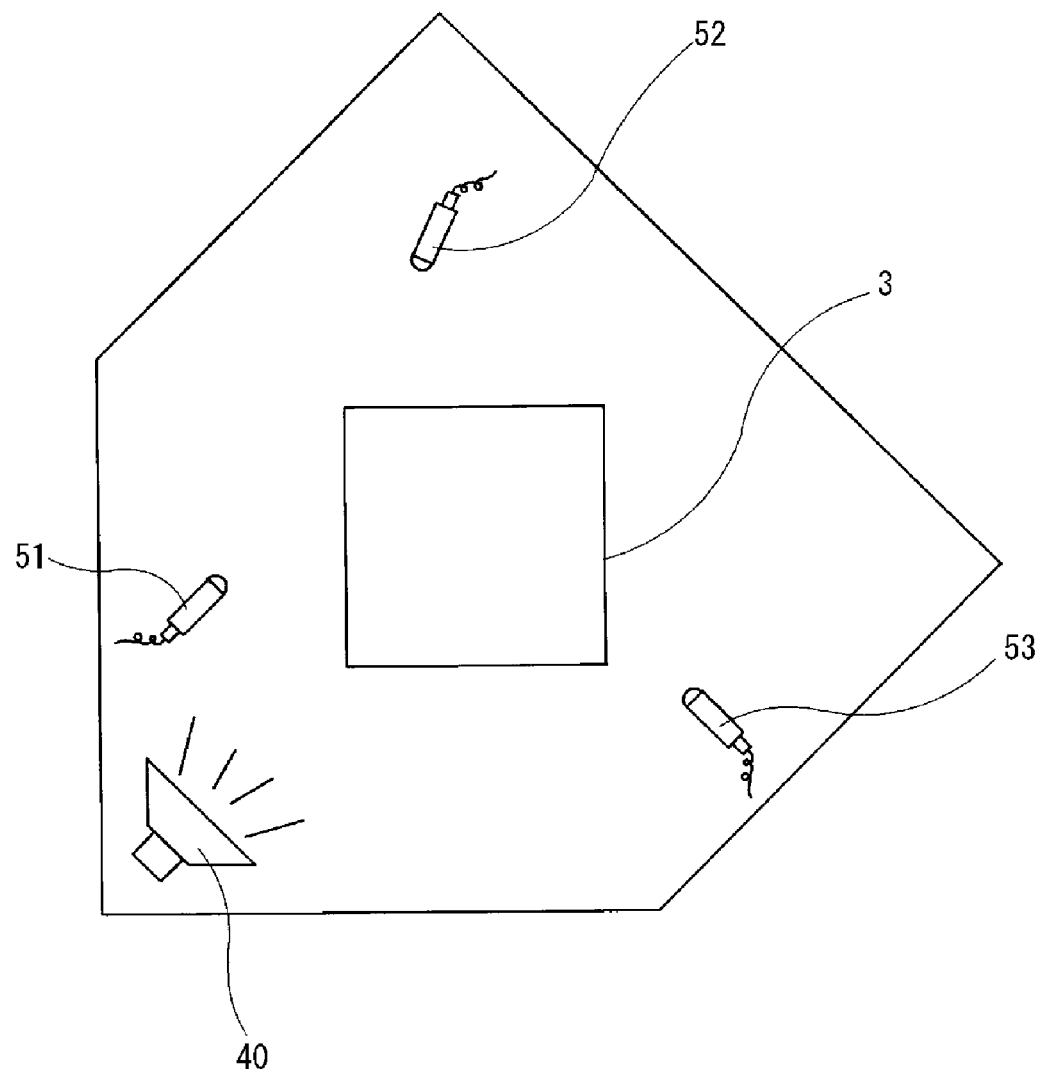
FIG. 10 is a plane view showing a measurement system of the sound absorption rate.

FIG. 10 is a plane view showing a measurement chamber of the sound absorption rate. A speaker 40 and microphones 51 through 53 are set in the measurement chamber and a sample of the ultra-light sound insulator is set on the floor of the measurement chamber.

In the examples of the single sheet 3 shown in FIGS. 11*a* through 11*d* according to this embodiment, sound insulating properties can be changed by changing the stiffness distribution pattern only (i.e., the stiffness variation rate within the area of gradually-decreasing stiffness 4) whereby leaving the total area-weight and the total thickness constant (e.g., with a total area-weight of 2000 g/m² and a total thickness of 20 mm). On the contrary, in conventional insulators of prior art, examples of which profiles are shown in FIGS. 11*e* through 11*h*, in order to change the sound insulating properties to attempt to match those of the present invention as exemplified in FIGS. 11(*a*) through 11(*b*), it is necessary to produce a stiff layer and a spring layer separately and to joint them with an adhesive.

Figure 11A:
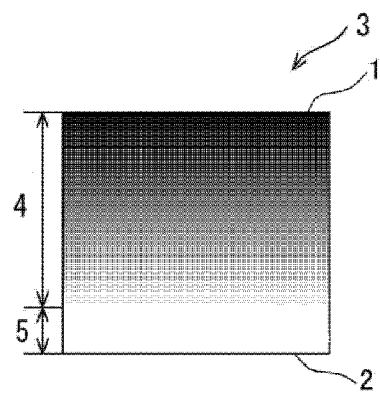
FIGS. 11a through 11d are cross-sectional schematic views of ultra-light sound insulators according to the first embodiment of the present invention.
Figure 11B:
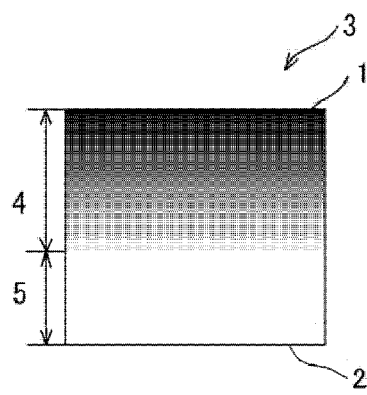
Figure 11C:
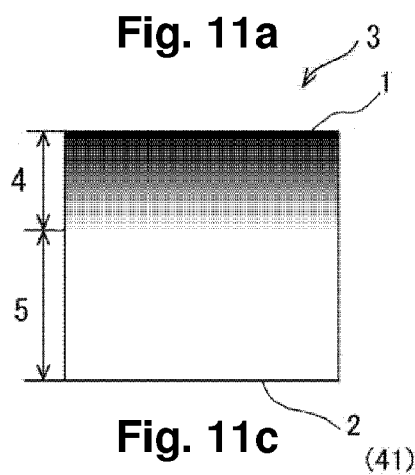
Figure 11D:
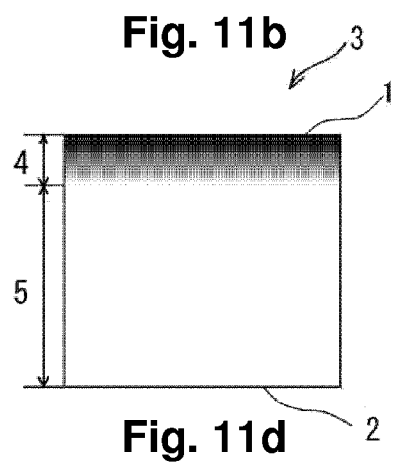
Figure 11E:
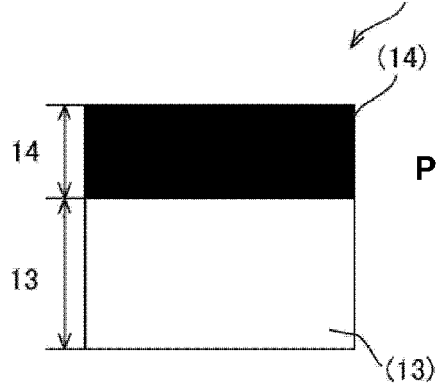
FIGS. 11e through 11h are cross-sectional schematic views of ultra-light sound insulation kits of prior art.
Figure 11F:
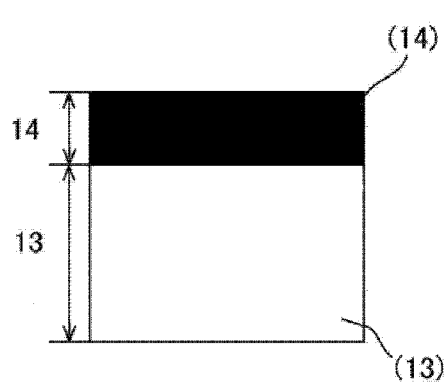
Figure 11G:
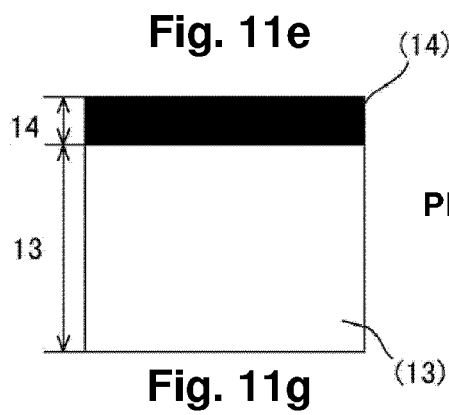
Figure 11H:
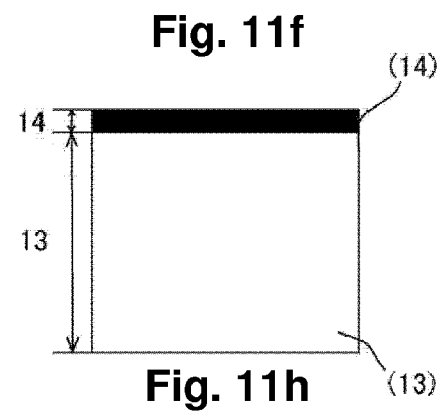

In the example shown in FIG. 11*e*, it is necessary to separately produce a stiff layer 14 having a thickness of 6 mm and an area-weight of 1200 g/m² and a spring layer 13 having a thickness of 14 mm and an area-weight of 800 g/m² and joint them with an adhesive. In the example shown in FIG. 11*f*, it is necessary to separately produce a stiff layer 14 having a thickness of 5 mm and an area-weight of 1000 g/m² and a spring layer 13 having a thickness of 15 mm and an area-weight of 1000 g/m² and joint them with an adhesive. In the example shown in FIG. 11*g*, it is necessary to separately produce a stiff layer 14 having a thickness of 4 mm and an area-weight of 800 g/m² and a spring layer 13 having a thickness of 16 mm and an area-weight of 1200 g/m² and joint them with an adhesive. In the example shown in FIG. 11*h*, it is necessary to separately produce a stiff layer 14 having a thickness of 3 mm and an area-weight of 600 g/m² and a spring layer 13 having a thickness of 17 mm and an area-weight of 1400 g/m² and joint them with an adhesive. Eight materials and adhesions of four times are necessary to produce these four sheets according to the prior art. Both the production processes and the joining processes are very complicated. On the contrary, only one material is necessary to produce the sheets according to this embodiment of the present invention. The advantages of this embodiment over the prior art are thus enormous.

The single sheet 3 as illustrated in FIG. 11*a* has a relatively higher airflow resistance and a lower air permeation. The airflow resistance becomes lower moving from FIG. 11*a* towards FIG. 11*d* and air permeation becomes higher moving from FIG. 11*a* towards FIG. 11*d*. Air permeation can be tuned by realizing these trends.

In the ultra-light sound insulator according to the first embodiment of the present invention described above, unlike in the conventional ultra-light sound insulators of prior art, it is not necessary to produce a stiff layer 14 by pressing material fibers or to joint the stiff layer 14 and a spring layer 13. An adhesive is also not necessary and production process is simplified. Accordingly, production cost and production time of a sound insulator are greatly reduced, allowing for an efficient mass-production.

Figure 12:
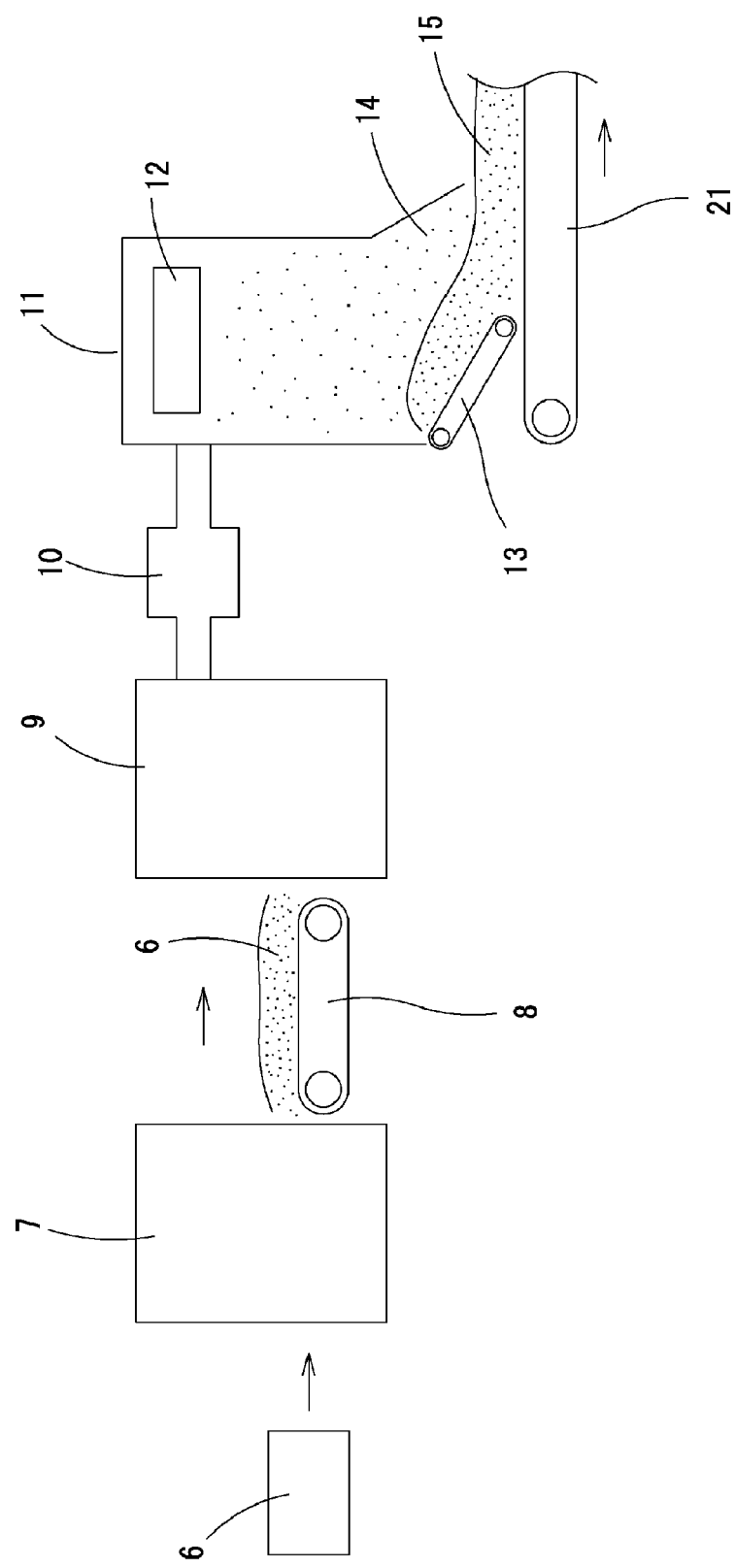
FIG. 12 is a schematic diagram of a web forming process in a production process of the ultra-light sound insulator.

A web forming process for the production of the ultra-light sound insulator according to the first embodiment of the present invention will be described hereinbelow. As shown in FIG. 12, raw fibers 6, which are made from a uniform material and have a uniform density, are placed into a hopper feeder 7 and roughly spread. The raw fibers 6 are then conveyed by a belt conveyer 8 into a fiber spreader 9, where they are spread more finely. The raw fibers 6 are then fed into a web former 11 by using a fan 10. The web former 11 is equipped with an intake device 12 to take the raw fibers 6 into the web former 11, and an accumulating belt 13 located below the intake device 12. There is an exit 14 on the right of the accumulating belt 13, and the accumulating belt 13 rotates in a direction towards the exit 14.

The raw fibers 6 are, for example, recycled polyethylene terephthalate fibers mixed with modified polyester fibers having a core-in-sheath structure, as binder fibers. The binder fibers, preferably having a core-in-sheath structure, may be any thermoplastic resins or thermosetting resins, e.g., thermoplastic low melting point polyethylene terephthalate fibers. The core part of a binder fiber has, for example, a melting temperature of 160° C. The sheath part of a binder fiber around the core part has, for example, a melting temperature of 130° C. Binder fibers can bind fibers due to the phenomenon of the sheath part of binder fibers having a lower melting temperature than the core part so that while the sheath part melts, the core part of binder fibers does not.

The raw fibers 6 taken into the web former 11 by the intake device 12 are diffused by air flow to the inside of the web former 11 and then accumulated on the accumulating belt 13. Because the space above the accumulating belt 13 is empty with no obstacles against accumulation of the raw fibers 6, the raw fibers 6 continue to be accumulated thicker and thicker at the right side of the accumulating belt 13 as the accumulating belt 13 rotates clockwise. The raw fibers 6 are accumulated to an appropriate thickness as a web 15 in the vicinity of the exit 14. The raw fibers 6 accumulated on the accumulating belt 13 are moved towards the exit 14 by the rotation of the accumulating belt 13, and then discharged as a web 15 onto a belt conveyer 21 located right below the accumulating belt 13.

In order to obtain a single sheet 3 having a desired thickness, it is necessary to adjust the thickness of the web 15. The thickness of the web 15 depends on the thickness of the raw fibers 6 accumulated on the accumulating belt 13. The thickness of the raw fibers 6 accumulated on the accumulating belt 13 can be adjusted by changing the rotating speed of the accumulating belt 13. A web 15 is thus formed by putting raw fibers 6 containing binder fibers and having a certain density into the web former 11 as described above. The mix rate of the binder fibers in the raw fibers 6 is preferably constant, however, it may be changed if necessary. The binder fibers, preferably having a core-in-sheath structure, may be any thermoplastic resins or thermosetting resins.

The raw materials in the web may be composed of, for example, three materials including (1) 50% by weight of reused fibers, e.g., fibers obtained by breaking fabrics and composed mainly of cotton fibers or ester fibers, (2) 20% by weight of polyester fibers having a thickness in the range from 7 to 10 denier and a length in a range from 35 to 66 mm, and (3) 30% by weight of binder fibers, e.g., modified polyester fibers having a core-in-sheath structure, used as low melting point thermoplastic resin fibers and having a thickness of 5 denier and a melting temperature in a range from 100 to 170° C.).

Figure 13:
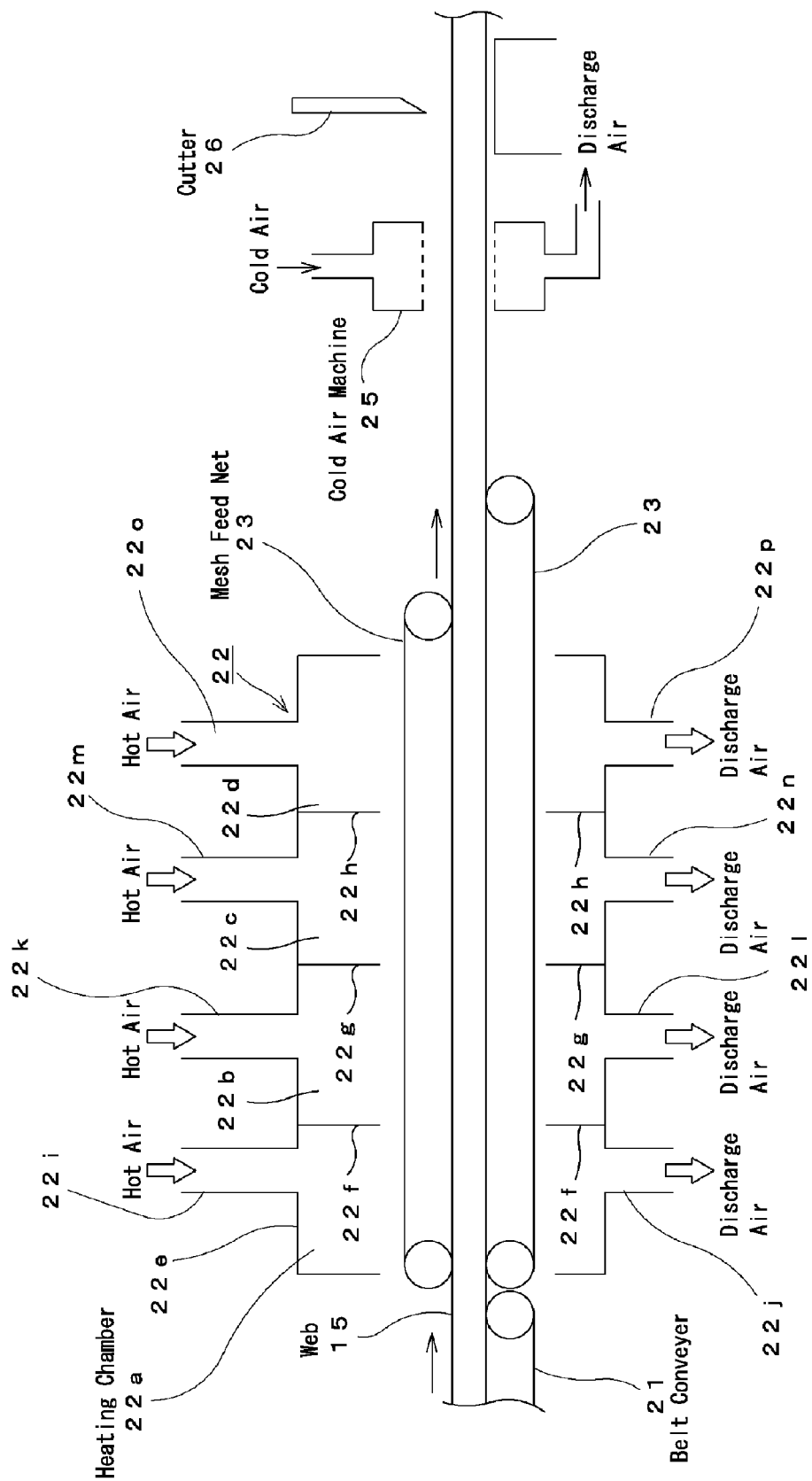
FIG. 13 is a schematic diagram of a thermoforming process in the production process of the ultra-light sound insulator.

A thermoforming process of the web 15 is described hereinbelow. In the thermoforming process, a heating furnace 22 is used as shown in FIG. 13. In this example, the web 15 contains thermoplastic binder fibers and has a melting temperature in a range from 100 to 250° C., and more preferably in a range from 100 to 170° C. The web 15 is sent by the belt conveyer 21 into the heating furnace 22 and heat-treated. The heating furnace 22 is divided into four heating chambers 22a through 22d by dividing plates 22f through 22h. Each heating chamber has a hot air supply port 22i, 22k, 22m, and 22o at the top of each chamber, respectively, and a hot air discharge port 22j, 22l, 22n, and 22p at the bottom of each chamber, respectively. The heating furnace 22 has also a couple of metal mesh feed nets 23 used to press and convey the web 15. The web 15 is pressed and conveyed by these mesh feed nets 23.

Hot air at a temperature ranging from 200 to 250° C. is supplied downwards in a direction vertical to the direction the web 15 is conveyed and suctioned via the hot air discharge ports 22j, 22l, 22n and 22p by suction equipment (not shown in the figure). The heating furnace 22 is divided into multiple chambers 22a through 22d to prevent the fluctuation of heating temperature. Heating time of the web 15 is preferably from 2 to 3 minutes. Hot air is passed through the web 15 by sending the hot air from above and suctioning the hot air from the opposite side. The web 15 is thus heated such that the binder fibers in the web 15 are melted and the raw fibers are jointed with each other to form a single sheet 3. In each heating chamber 22a through 22d, the flow direction of the hot air is set in a certain direction. The stiffness ratio of the top surface to the bottom surface of the web 15 and the stiffness distribution pattern depend on the conveying speed of the web 15, difference in the conveying speed between the front surface and the bottom surface of the web 15, temperature of the hot air, flow rate of the hot air, and suction conditions of the hot air (suction pressure, air suction rate and the like). Desired sound insulating properties are obtained by setting proper conditions.

In this example, the web 15 was pressed in the flow direction of the hot air against the lower mesh feed net 23 and whereby a stiffness distribution which is lower towards the upper surface and higher towards the lower surface was formed.

After the heating process described above, cold air was blown over the web 15 by using a cold air machine 25 to cool down the web 15 and fix the thickness of the web 15. The thickness of the web 15 was adjusted to an intended thickness by using a cold press roll if necessary. The web was then cut into a desired length by a cutter 26 to obtain a single sheet 3. The speed of the mesh feed nets 23 is, for example, 3 m/min. The area-weight and the thickness of the single sheet 3 is, for example, 2000 g/m$^2$ and 20 mm respectively. The single sheet 3 was adjusted to have a total area-weight in a range from 500 g/m$^2$ to 2500 g/m$^2$, a total thickness in a range of 5 to 50 mm, and a total air permeation in a range of 5 to 25 cm$^3$/cm$^2$·sec. The speed of the accumulating belt 13 was 1 to 7 m/min, the speed of the mesh feed nets 23 was 1 to 7 m/min, and in the heating furnace 22, the distance between the two mesh feed nets 23 was 15 mm, the temperature of the hot air was 160 to 200° C., and the heating time was from 2 to 3 minutes.

The single sheet 3 made in this way could be pressed further to mold the sheet into a desired map shape in a later process, or the single sheet 3 could be heated and softened to be molded into a desired shape fitting with the shape of a dash board by using a cold press metal mold having a desired mold shape. The binder fibers used in the single sheet 3 may be any of thermoplastic resins or thermosetting resins. The material and the molding method of the single sheet 3 are not limiting, as long as the material comprises collective fibers having excellent sound insulating properties.

An ultra-light sound insulator according to a second embodiment of the present invention will be described hereinbelow with reference to the accompanying figures. As shown in FIGS. 14, 15b and 16b, an ultra-light sound insulator according to a second embodiment of the present invention is a single sheet 103 having a vehicle interior side surface 101 and a vehicle exterior side surface 102, in which a first-stiffness area 105 extending continuously from the vehicle interior side surface 105 and a second-stiffness area 106 extending continuously from the vehicle exterior side surface 102 are connected via an area of gradually-decreasing stiffness 104.

The stiffness ratio of the vehicle interior side surface 101 to the vehicle exterior side surface 102 is in the range from 1.1 to 10. In the stiffness distribution pattern of the single sheet 103, stiffness decreases gradually in the area of gradually-decreasing stiffness 104. The single sheet 103 is an ultra-light sound insulator characterized in that the air permeation is from 3 to 25 cm$^3$/cm$^2$·sec based on the thickness and the stiffness distribution pattern (stiffness variation rate in the vertical direction) of the area of gradually-decreasing stiffness 104 and the like.

Figure 16A:
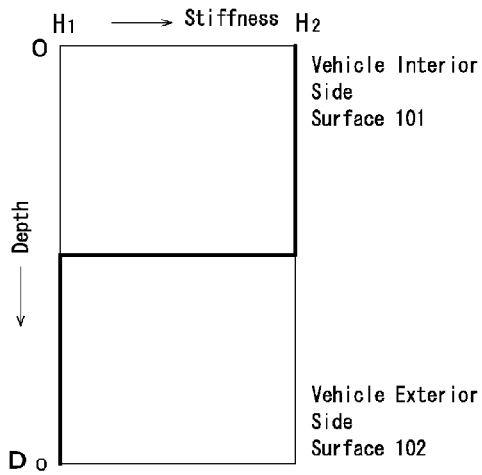
FIG. 16a shows the stiffness distribution pattern of the ultra-light sound insulation kit 41 of prior art.
Figure 16B:
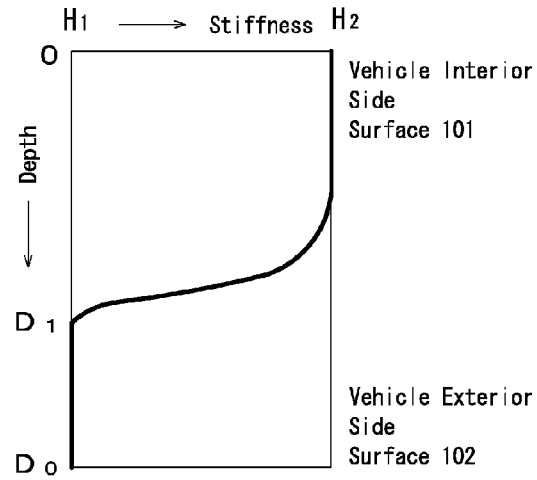
FIG. 16b shows the stiffness distribution pattern of the ultra-light sound insulator according to the second embodiment of the present invention.

FIGS. 16a and 16b are graphs showing stiffness variation in sound insulators along the thickness direction (depth direction) of the sound insulators. An example of the stiffness distribution pattern of a convention sound insulator of prior art is shown in FIG. 16a. An example of the stiffness distribution pattern of a sound insulator according to the second embodiment of the present invention is shown in FIG. 16b. The stiffness distribution pattern shown in FIG. 16a is step-like. On the other hand, the graph shown in FIG. 16b has a stiffness distribution pattern in which the stiffness function shifts from a convex decrease to a concave decrease as the depth increases from the vehicle interior side surface 101 towards the vehicle exterior surface 102.

As in the first embodiment, this stiffness distribution pattern shown is that of an ideal curve, i.e., an average stiffness distribution pattern averaged over a cross-sectional area. Practically, the stiffness distribution may be fluctuating along the direction parallel to the vehicle interior side surface 101 and/or the vehicle exterior side surface 102. Similarly, the stiffness distribution may be fluctuating along the direction perpendicular to the vehicle interior side surface 101 and/or the vehicle exterior side surface 102. However, as averaged over the entire cross-sectional area between the vehicle interior side surface 101 and the vehicle exterior side surface 102, or a portion of the cross-sectional area, the ultra-light sound insulator has a stiffness distribution pattern in which the stiffness is decreasing gradually starting from the vehicle interior side surface 101 towards the vehicle exterior side surface 102.

Figure 17:
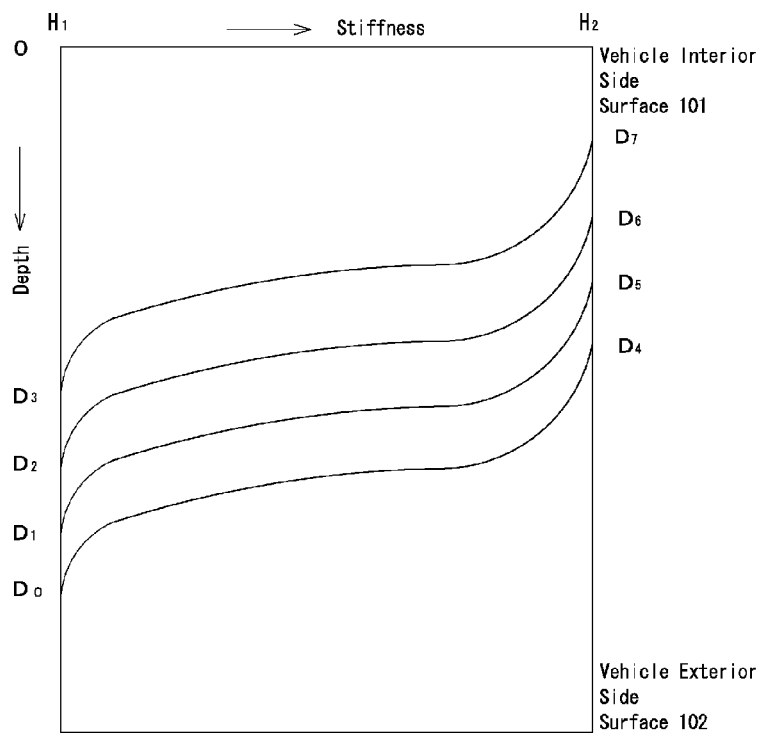
FIG. 17 shows stiffness distribution patterns of ultra-light sound insulators according to the second embodiment of the present invention.

Various stiffness distribution patterns are possible for this embodiment and a few non-limiting examples are shown in FIG. 17. These patters include those wherein (a) the area of gradually-decreasing stiffness 104 is located near the rear surface (from depth $D_4$ to $D_0$), and (b) the area of gradually-decreasing stiffness 104 is located from depth $D_5$ to $D_1$, from depth $D_6$ to $D_2$, and from depth of $D_7$ to $D_3$.

Sound insulating properties can be changed by changing the stiffness distribution pattern (stiffness variation rate and the like). As shown in FIG. 17, it is preferable that the first-stiffness area 105 and the second-stiffness area 106 are uniform-stiffness areas each having a uniform stiffness.

The graphs of transmission loss and sound absorption rate of the ultra-light sound insulator of the second embodiment shows similar tendencies to those illustrated in graphs in FIG. 7 and FIG. 9 with regard to the first embodiment. Similar measurement systems to those applied in the first embodiment shown in FIG. 8 and FIG. 10 are used in this embodiment. Accordingly, the explanation of the measurement systems applicable to the first embodiment also applies to this embodiment.

The single insulator sheet 103 has a total area-weight preferably in a range from 600 to 1500 g/m² and a total thickness in a range from 10 to 20 mm in cases when the sheet is not molded in a later process, and has an total area-weight preferably in a range from 1400 to 2500 g/m² and a total thickness in a range from 15 to 35 mm in cases when the sheet is molded in a later process.

Materials used to produce the single sheet 103 are similar to those used to produce the single sheet 3 of the first embodiment. However, materials or composition of materials are different in the first-stiffness area 105 than in the second-stiffness area 106. For example, the single sheet 103 may have a structure composed of multiple felt areas including, the first-stiffness area 105, the second-stiffness area 106 and the area of gradually-decreasing stiffness 104, wherein the three areas 104 through 106 contain the same raw fibers but different amounts of binder fibers; raw fibers are tangled and contacted and jointed to each other by the binder fibers; and the amount of the binder fibers in the first-stiffness area 105 is more than that in the second-stiffness area 106. It is preferable that air permeation of the single sheet 103 be adjusted to fall in the range from 3 to 25 cm³/cm²·sec by adjusting the thickness and the stiffness distribution patterns of and the area of gradually-decreasing stiffness 104 and the like.

EXAMPLE 2

The ultra-light sound insulator of this example is a single sheet 103 made of a felt and located in a vehicle interior. This single sheet 103 has an over all average density of 0.1 g/cm³, a total average area-weight of 2000 g/m², a total thickness of 20 mm (5 mm for the first-stiffness area 105, 2 mm for the area of gradually-decreasing stiffness 104, and 13 mm for the second-stiffness area 106), and an air permeability of 8 cm³/cm²·sec. The stiffness ratio of the vehicle interior side surface 101 to the vehicle exterior side surface 102 was 4.40/2.10=2.10.

The ultra-light sound insulator of this embodiment has similar advantages as the insulator of the first embodiment.

The web forming process to produce the ultra-light sound insulator of the second embodiment is similar to that of the first embodiment. The differences are explained hereinbelow. In the first embodiment, the stiffness distribution pattern of the area of gradually-decreasing stiffness 4 depends on process conditions, such as the amount and temperature of the hot air. In the second embodiment, additionally the material used to produce the first-stiffness area 105 is different from that used to produce the second-stiffness area 106. For example, the first-stiffness area 105 and the second-stiffness area 106 may comprise different amounts of binder fibers, or they may comprise the same amount of binder fibers but different amounts of raw fibers. In this example, in order to make the material of the first-stiffness area 105 different from that of the second-stiffness area 106, different amounts of binder fibers were used.

In the second embodiment, two supply lines of raw fibers 6 are provided, each including a hopper feeder 7, a belt conveyer 8, a fiber spreader 9 and a fan 10. Raw fibers 6 of different materials are supplied through each line. Two intake devices 12 and an accumulating belt 13 are provided on the right and left side inside the web former 11. The raw fibers 6 for the second-stiffness area 106 are taken from the left intake device 12 and are accumulated mainly on the left accumulating belt 13. The raw fibers 6 for the first-stiffness area 105 are taken from the right intake device 12 and are accumulated mainly on the right accumulating belt 13.

According to this structure, the percentage of the raw fibers 6 for the first-stiffness area 105 becomes higher continuously towards the right end of the right accumulating belt, and the percentage of the raw fibers 6 for the second-stiffness area 106 becomes higher continuously towards the left end of the left accumulating belt. As the left accumulating belt 13 rotates in clockwise direction and the right accumulating belt 13 rotates in anticlockwise direction, two raw fibers 6 are brought together at the center of the right and left accumulating belts 13 and are then sent onto the belt conveyer 21. By supplying two kinds of raw fibers 6 each having a uniform density and a uniform material but having different mix rates of the binder fibers from one another, and after passing the process described above, a web, in which the percentage of the raw fibers 6 for the first-stiffness area 105 becomes higher towards the upper surface and the percentage of the raw fibers 6 for the second-stiffness area 106 becomes higher towards the lower surface, is discharged by the belt conveyer 21. The amounts of the supplied raw fibers 6 for the first-stiffness area 105 and the second-stiffness area 106 are nearly the same.

When the total area-weight of the sheet 103 is set to be 2000 g/m², an area-weight of 1200 g/m² is contributed by the fibers for the first-stiffness area 105 and an area-weight of 800 g/m² is contributed by the fibers for the second-stiffness area 106.

Figure 18:
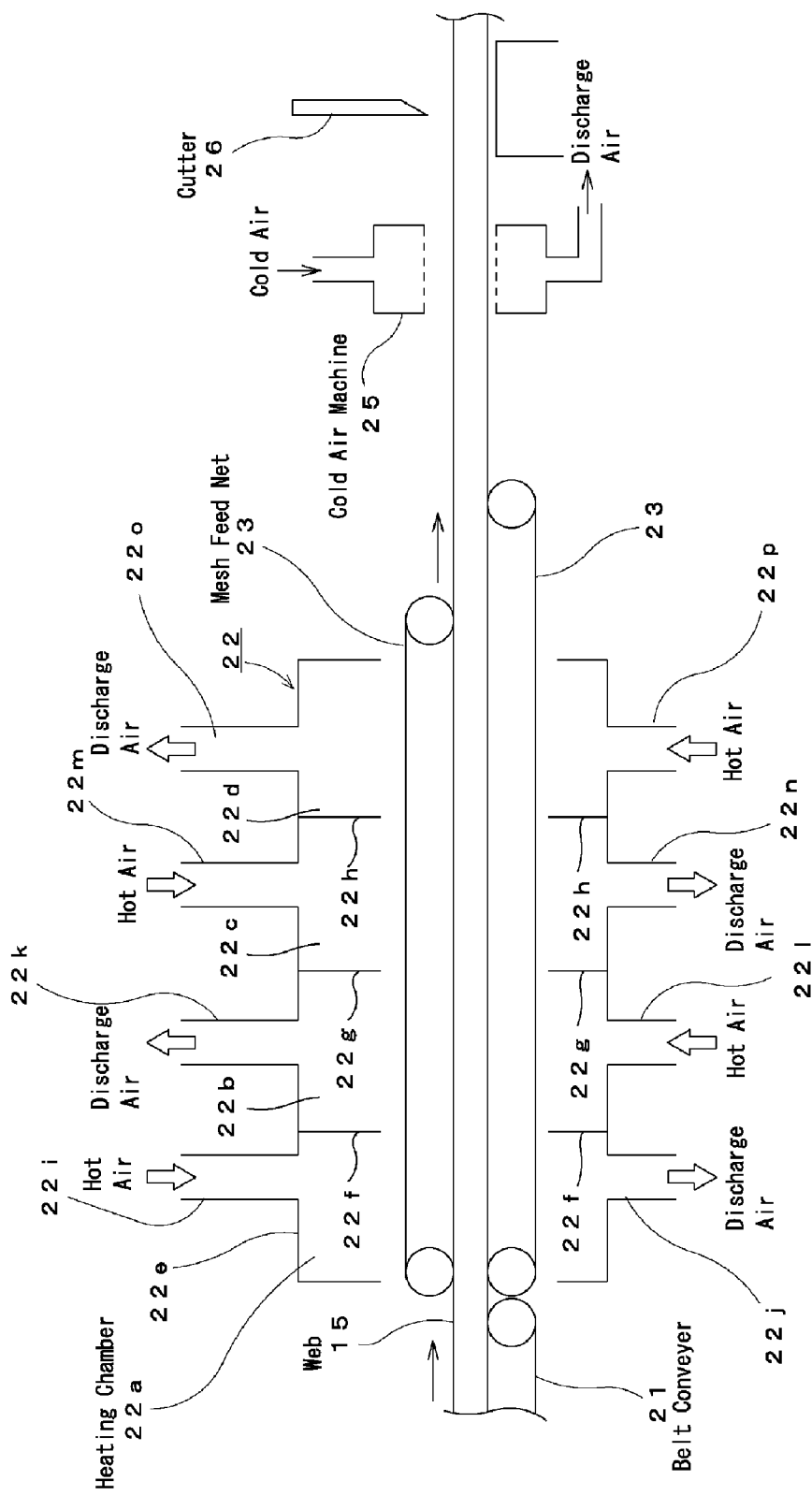
FIG. 18 shows a schematic diagram of a thermoforming process in the production process of the ultra-light sound insulator.

As shown in FIG. 18, a thermoforming process for the production of the ultra-light sound insulator of the second embodiment is almost the same as that of the first embodiment. The differences are explained hereinbelow. In the second embodiment, the high-stiffness area 105 and the low-stiffness area 106 differ mainly by the amounts of the binder fibers they contain. In the high-stiffness area 105 binder fibers are present at a higher density—more fibers are jointed to each other by the binder fibers, resulting in a lower re-expansion after being heated by hot air, while in the low stiffness area 106 binder fibers are present at a lower density—less fibers are jointed to each other, resulting in a greater re-expansion after being heated by hot air. Accordingly, the density differential is generated inside the web when the web initially pressed by hot air in the direction of flow re-expands.

Although the direction of flow of the hot air may also be the same as in the first embodiment, the direction of the hot air was set to be opposite in this embodiment. The temperature distribution in the web was different when the hot air is passed through the web from above and when the hot air is passed through the web from beneath. By alternating the direction of the hot air, temperature distribution in the web can be kept uniform during heating. Unlike in the first embodiment, a density differential (a stiffness distribution) is generated mainly by the difference in the contents of the binder fibers in the second embodiment. Accordingly, it is often more advantageous to keep the temperature in the web uniform.

Definitions

The term "gradually," as used herein with respect to a decrease in the stiffness means that the function of stiffness versus depth in an area of gradually-decreasing stiffness is continuous and smooth rather than discontinuous or step-like.

The term "thickness" as used herein and as applied to the insulator of the present invention refers to the distance between the vehicle exterior side surface and the vehicle interior side surface.

When referring to insulators of the present invention, it is convenient to describe their properties based on cross-sectional "areas" rather than volumes. It is, of course, to be understood that an insulator, or an insulator sheet, is a 3-dimensional structure having an overall length, width and thickness. For convenience, however, a two dimensional cross-sectional area of an insulator having a length dimension and thickness is visualized and referred to, and the width dimension is generally left out. Specifically, in the drawings, the thickness is drawn in the vertical direction and the length is drawn in the horizontal direction. The properties of an insulator may be constant or may vary in the direction of its width.

The embodiments and their examples discussed above are to be considered illustrative and non-limiting in all aspects. There may be many modifications, changes, and alterations without departing from the scope and the spirit of the main characteristics of the present invention. All changes within the meaning and range of equivalency of the claims are therefore intended to be embraced therein. For example, thin non-woven fabrics may be added on the vehicle interior side surface and the vehicle exterior side surface, and this is also within the true technical scope of this invention.

What is claimed is:

1. A single sheet ultra-light sound insulator located in a vehicle interior, comprising as a single sheet of material:
    a vehicle exterior side surface;
    a vehicle interior side surface; and
    at least one area of gradually-decreasing stiffness having a thickness and being disposed between said vehicle exterior side surface and said vehicle interior side surface;
wherein
    the stiffness of said area of gradually-decreasing stiffness decreases gradually and monotonically over entire said thickness of said area of gradually-decreasing stiffness in the direction from said vehicle interior side surface toward said vehicle exterior side surface.

2. The insulator of claim 1, wherein said area of gradually-decreasing stiffness is made of cotton fibers and binder fibers.

3. The insulator of claim 1, wherein the stiffness ratio of said vehicle interior side surface to said vehicle exterior side surface is between 1.1 and 10.

4. The insulator of claim 1, wherein the air permeation of said insulator is between 3 and 25 $cm^3/cm^2 \cdot sec$.

5. The insulator of claim 1, wherein the air permeation of said insulator is a function of the rate at which the stiffness changes within said area of gradually-decreasing stiffness.

6. A single sheet insulator comprising:
    a vehicle exterior side surface;
    a vehicle interior side surface; and
    at least one area of gradually-decreasing stiffness disposed between said vehicle exterior side surface and said vehicle interior side surface;
wherein
    the stiffness of said area of gradually-decreasing stiffness decreases gradually with depth in the direction from said vehicle interior side surface towards said vehicle exterior side surface; and
    a function expressing said stiffness in terms of said depth decreases monotonically over the entire distance from said vehicle interior side surface to said vehicle exterior side surface.

7. A motor vehicle with a vehicle exterior and a vehicle interior, the motor vehicle comprising the insulator of claim 1, wherein said vehicle exterior side surface faces toward the vehicle exterior and the vehicle interior side surface faces toward the vehicle interior.

8. The insulator of claim 6, wherein said area of gradually-decreasing stiffness is formed by sending hot air from one side and suctioning the hot air from an opposite side in a direction vertical to a conveying direction of a web formed from raw fibers, and passing the hot air though said web and pressing said web by the hot air in a flow direction of the hot air.

9. The insulator of claim 6, wherein a sound absorption rate of the insulator at between 100 and 6300 Hz is between about 0 and about 0.98.

10. The insulator of claim 6, wherein a sound absorption rate of the insulator at between 400 and 6300 Hz is between about 0.6 and about 0.98.

11. The insulator of claim 6, wherein a sound transmission loss of the insulator at between 400 and 6300 Hz is between about 0 and about 17 dB.

12. The insulator of claim 6, wherein a sound transmission loss of the insulator at between 800 and 6300 Hz is between about 5 and about 17 dB.

13. A single sheet ultra-light sound insulator located in a vehicle interior, having a thickness and comprising as a single sheet of material:
    a vehicle exterior side surface;
    a vehicle interior side surface; and
    at least one area of gradually-decreasing stiffness disposed between said vehicle exterior side surface and said vehicle interior side surface;
wherein
    said area of gradually-decreasing stiffness is formed by blowing hot air from one side and suctioning the hot air from an opposite side in a direction vertical to a conveying direction of a web formed from raw fibers, and passing the hot air though said web and pressing said web by the hot air in a flow direction of the hot air.

14. The insulator of claim 13, wherein said web contains thermoplastic binder fibers as raw fibers, and said insulator is formed by conveying said web with pressing and sending the hot air from said one side and suctioning the hot air from said opposite side in said direction vertical to said conveying direction of said web, and passing the hot air though said web, and melting said binder fibers in said web to join said raw fibers with one another.

15. The insulator of claim 13, wherein a stiffness distribution pattern of the insulator is set taking into account a conveying speed of said web, a difference in conveying speeds between a front surface and a rear surface of said web, a temperature of the hot air, a flow rate of the hot air, and suction conditions of the hot air.

16. The insulator of claim 13, wherein said flow direction of the hot air is set to be alternating, and a temperature distribution in said web is different when the hot air is passed through the web from above and when the hot air is passed through the web from beneath.

17. The insulator of claim 13, whereby forming said area of gradually-decreasing stiffness as described improves the sound insulating properties in the resonance domain.

18. The insulator of claim 13, wherein said area of gradually-decreasing stiffness has the highest stiffness at said vehicle interior side surface; said area of gradually-decreasing stiffness has the lowest stiffness value at said vehicle exterior side surface; and the stiffness ratio of said vehicle interior side surface to said vehicle exterior side surface is between 1.1 and 10.

19. A method for reducing noise in a vehicle interior, the improvement comprising providing the insulator of claim 13 and orienting the insulator in the vehicle interior such that said vehicle exterior side surface faces toward the vehicle exterior and the vehicle interior side surface faces toward the vehicle interior.

20. The insulator of claim 13, wherein a sound absorption rate of the insulator at between 100 and 6300 Hz is between about 0 and about 0.98; a sound absorption rate of the insulator at between 400 and 6300 Hz is between about 0.6 and about 0.98; a sound transmission loss of the insulator at between 400 and 6300 Hz is between about 0 and about 17 dB; and a sound transmission loss of the insulator at between 800 and 6300 Hz is between about 5 and about 17 dB.

21. The insulator of claim 13, further comprising
a first area of uniform stiffness disposed between said area of gradually-decreasing stiffness and said vehicle interior side surface, and
a second area of uniform stiffness disposed between said area of gradually-decreasing stiffness and said vehicle exterior side surface.
wherein
the stiffness of said area of gradually-decreasing stiffness decreases gradually and monotonically over an entire thickness of said area of gradually-decreasing stiffness and-in the direction from said vehicle interior side surface towards said vehicle exterior side surface;
the stiffness of said first area of uniform stiffness equals the highest stiffness value of said area of gradually-decreasing stiffness, and
the stiffness of said second area of uniform stiffness equals the lowest stiffness value of said area of gradually-decreasing stiffness; and
the stiffness ratio of said vehicle interior side surface to said vehicle exterior side surface is between 1.1 and 10.

22. The insulator of claim 21, wherein amounts of the binder fibers are set differently for said first area of uniform stiffness and for said second area of uniform stiffness; and wherein a high density of the binder fibers is used for said first area of uniform stiffness and a low density of the binder fibers is used for said second area of uniform stiffness.

23. The insulator of claim 13, wherein the stiffness of said area of gradually-decreasing stiffness decreases gradually and monotonically over the entire said thickness in the direction from said vehicle interior side surface toward said vehicle exterior side surface.

* * * * *